United States Patent [19]
Carmassi et al.

[11] 3,958,943
[45] May 25, 1976

[54] PROCESS TO PURIFY GAS CONTAINING HYDROGEN SULPHIDE BY MEANS OF AMINES

[75] Inventors: Michel Carmassi, Mazenes-Lezons; Bernard Louvel, Buros; Georges Vandesande, Argagnon, all of France

[73] Assignee: Societe Nationale des Petroles d'Aquitaine, France

[22] Filed: Sept. 12, 1974

[21] Appl. No.: 505,520

Related U.S. Application Data

[62] Division of Ser. No. 258,265, May 31, 1972, abandoned.

[30] Foreign Application Priority Data

June 1, 1971 France ............................. 71.19749

[52] U.S. Cl. ........................... 23/255 R; 23/255 E; 423/228; 423/229; 235/151.12
[51] Int. Cl.² ................. C01B 17/16; G06F 15/46
[58] Field of Search ........... 423/210, 220, 229, 232, 423/234, 228; 23/232 R, 232 E, 254 R, 254 E, 255 R, 255 E; 235/151.12

[56] References Cited
UNITED STATES PATENTS

3,338,664   8/1967   Bally et al. .......................... 23/232 X

OTHER PUBLICATIONS

Savas, "Computer Control of Industrial Processes", McGraw-Hill, 1965 pp. 52–53.

*Primary Examiner*—R. E. Serwin
*Attorney, Agent, or Firm*—Bacon & Thomas

[57] ABSTRACT

An improved process for purifying gas containing hydrogen sulphide and possibly other acid impurities, by means of amines, consisting of absorption of these impurities by contact between the gas for purification and an amine solution, particularly a mono- or di-ethanolamine solution, steam regeneration of the amine solution after it has fixed the acid compounds, and recycling of the regenerated solution to the absorption zone, characterized by the fact that the sulphur content of the regenerated amine solution is kept at an optimum level by varying the flow of regenerating steam.

This improved process ensures better elimination of acid compounds, particularly hydrogen sulphide, by means of amines, and keeps the cost of purification as low as possible.

3 Claims, 2 Drawing Figures

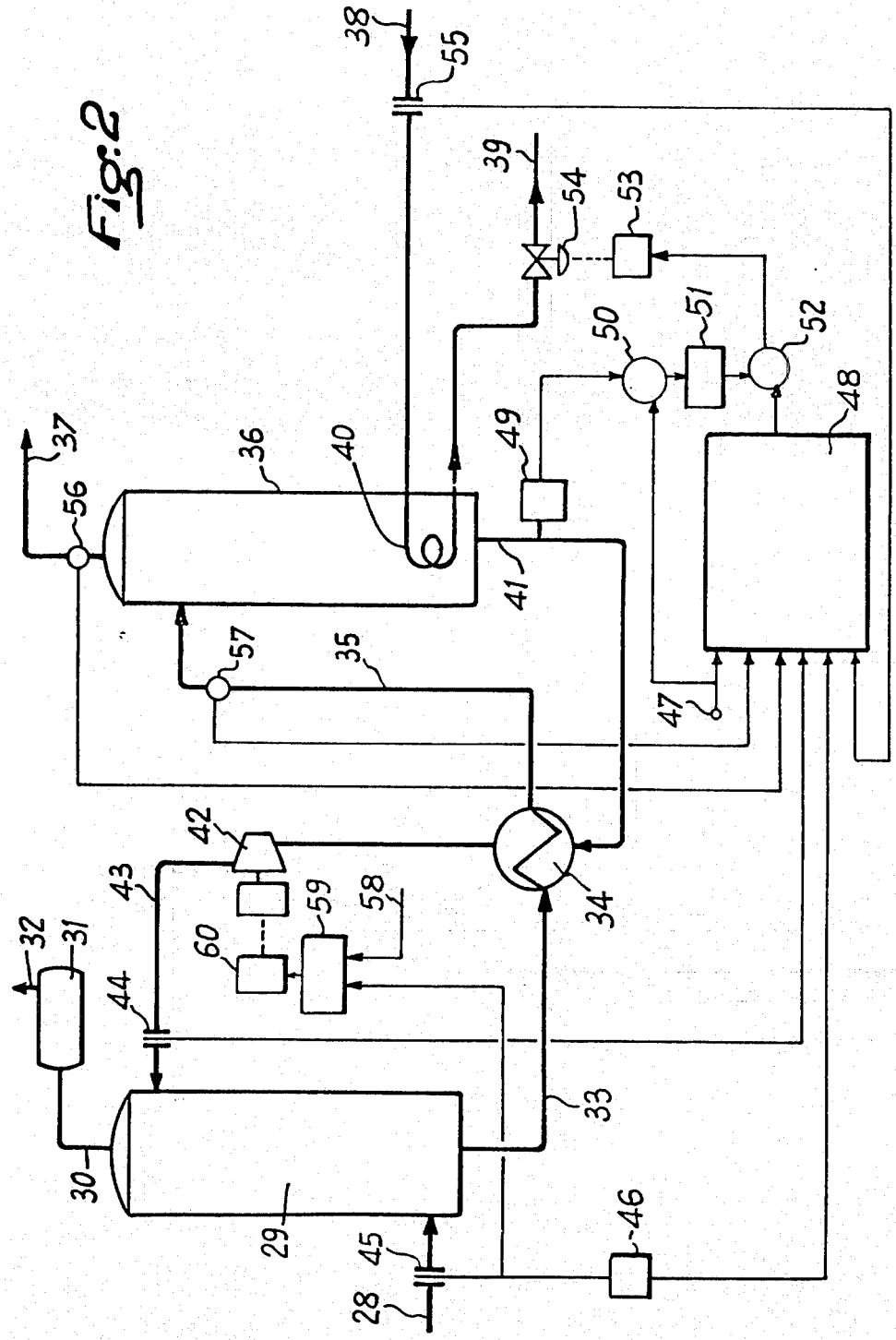

PROCESS TO PURIFY GAS CONTAINING HYDROGEN SULPHIDE BY MEANS OF AMINES

This is a divisional of application Ser. No. 258,265 filed on May 31, 1972, and now abandoned.

This invention concerns an improved process for purifying gas containing hydrogen sulphide and other acid compounds, by fixing them with amine bases. More specifically, it concerns an improved method of controlling the purification process, and an apparatus to implement this improvement.

Acid compounds, such as hydrogen sulphide and carbon dioxide, can be removed from gas by fixing them with amine bases, particularly alkanolamines such as mono-ethanolamine and di-ethanolamine. This is done by placing the gas containing the compounds in contact with an amine solution, in an absorption zone. The solution fixes the compounds, in the form of salts of the amine, which remain stable under the pressure and temperature conditions prevailing in the zone. The purified gas may then be sent to a caustic washer, where any remaining traces of acid gas are removed. The liquid effluent from the absorption zone, the amine solution that has been used to fix the acid compounds, is sent to a regeneration zone, where it is heated indirectly by steam to a high enough temperature to free the acid gases by decomposing the amine salts formed during absorption, thus regenerating the amine solution which is recycled to the absorption zone. The acid gases discharged during regeneration are collected for subsequent treatment.

To ensure proper removal of the acid compounds in the gas, particularly hydrogen sulphide, the absorption capacity of the amine solution needs to be restored sufficiently by regeneration as uniformly as possible. This is usually done by keeping the temperature at the head of the regeneration column at a fixed level, by varying the flow of regenerating steam. Results obtained by this method are unsatisfactory, however, since the temperature at the head of the regeneration column does not depend only on the flow of regenerating steam, but also on the amount of amine solution to be regenerated. In other words, even if the temperature is maintained by altering the flow of steam the amine solution may be over-regenerated, resulting in excessive steam consumption, or under-regenerated, resulting in inadequate fixing of acid compounds during the next absorption stage, with consequent persistence of contamination in the gas, and higher consumption of caustic soda during final purification.

This invention offers a way of overcoming these drawbacks by providing an improvement in the process for purifying gas containing hydrogen sulphide by means of amine base solutions, which ensures that the acid-gas absorption capacity of the regenerated amine solution will remain uniform, and which keeps the cost of purification as low as possible, a major industrial asset.

This improved process for purifying gas containing hydrogen sulphide and other acid compounds consists of an absorption stage, in which the gas needing purification is placed in contact with an amine solution to fix the acid compounds, and a steam regeneration stage, in which the amine solution containing the fixed acid compounds is regenerated, before being recycled to the absorption zone, and is characterized by the fact that the sulphur content of the regenerated amine solution is kept at an optimum level, by varying the flow of regenerating steam.

Investigation of the cost of the purification process, in relation to the sulphur content of the regenerated amine solution, shows that it is lowest for one particular sulphur content. By choosing this content, or as near it as is compatible with proper functioning of the unit, as reference, the cost of purification can be kept as low as possible.

In one embodiment of this improved process, variation in the flow of regenerating steam occurs in response to a control value, related to the quantity of steam needed to adjust the immediate sulphur content of the regenerated amine solution to the optimum level.

In another embodiment of this improved process, variation in the flow of regenerating steam occurs in response to a control value, containing one component representing the theoretical quantity of steam needed to obtain optimum sulphur content in the regenerated amine solution, and another component representing the quantity of steam needed to adjust the immediate sulphur content of the regenerated solution to the optimum level.

The component representing the theoretical quantity of steam needed to obtain optimum sulphur content in the regenerated amine solution is obtained from a mathematical model involving the optimum content, regeneration temperature, flow rate of amine solution, inlet temperature of this solution, and flow rate of acid compounds.

In one recommended embodiment of this improved process, variation in the flow of regenerating steam occurs in response to a control value, which is the resultant of a value representing a predetermined quantity of steam, approximately the theoretical quantity needed for regeneration, and of a value related to the sum of the quantity of steam needed to adjust the sulphur content of the regenerated solution to the optimum level, and of the quantity representing the difference between the theoretical and predetermined quantities of steam.

In another embodiment, the flow rate by weight of regenerated amine solution is controlled by the flow rate by weight of gas entering the absorption zone for purification.

The apparatus for implementation of this improved process consists of an analyser to measure the sulphur content of the regenerated amine solution, a subtractor producing a signal proportional to the difference between the sulphur content as measured by the analyser, and the optimum content, a compensating unit producing, from the signal supplied by the subtractor, a signal representing the quantity of steam needed to adjust the immediate sulphur content of the amine solution to the optimum level, and means of altering the flow of regenerating steam in response to the signal representing the quantity of steam needed for adjustment.

In one embodiment, the apparatus includes a computer which produces a signal representing the theoretical quantity of steam needed to obtain optimum sulphur content in the regenerated amine solution, and an addition relay, which receives the signals from the computer and compensating unit, and delivers a resulting signal to control the steam-flow regulation system.

In one recommended embodiment, the computer supplies an output signal representing the difference between the theoretical quantity of steam needed to obtain optimum sulphur content in the regenerated amine solution, and a predetermined quantity of steam, close to this theoretical quantity, and the addition relay receives a signal representing this predetermined quantity, as well as the signals from the computer and compensating unit.

The system of regulating the flow of regenerating steam preferably consists of a servomechanism which controls the positioning of a valve on the steam outlet pipe.

The compensating unit may be of any type used in regulation systems, and particularly the type with integral and derived proportional action.

The system of measuring the sulphur content of the regenerated amine solution may operate continuously or on a batch basis. An X-ray sulphurimeter, or any other suitable analyser, can be used.

The invention will be easier to understand from reading the following description of two of the possible embodiments of the invention, with the accompanying figures.

FIG. 2 shows a diagram of a similar unit with a system to implement another embodiment of the process.

Figure 1:
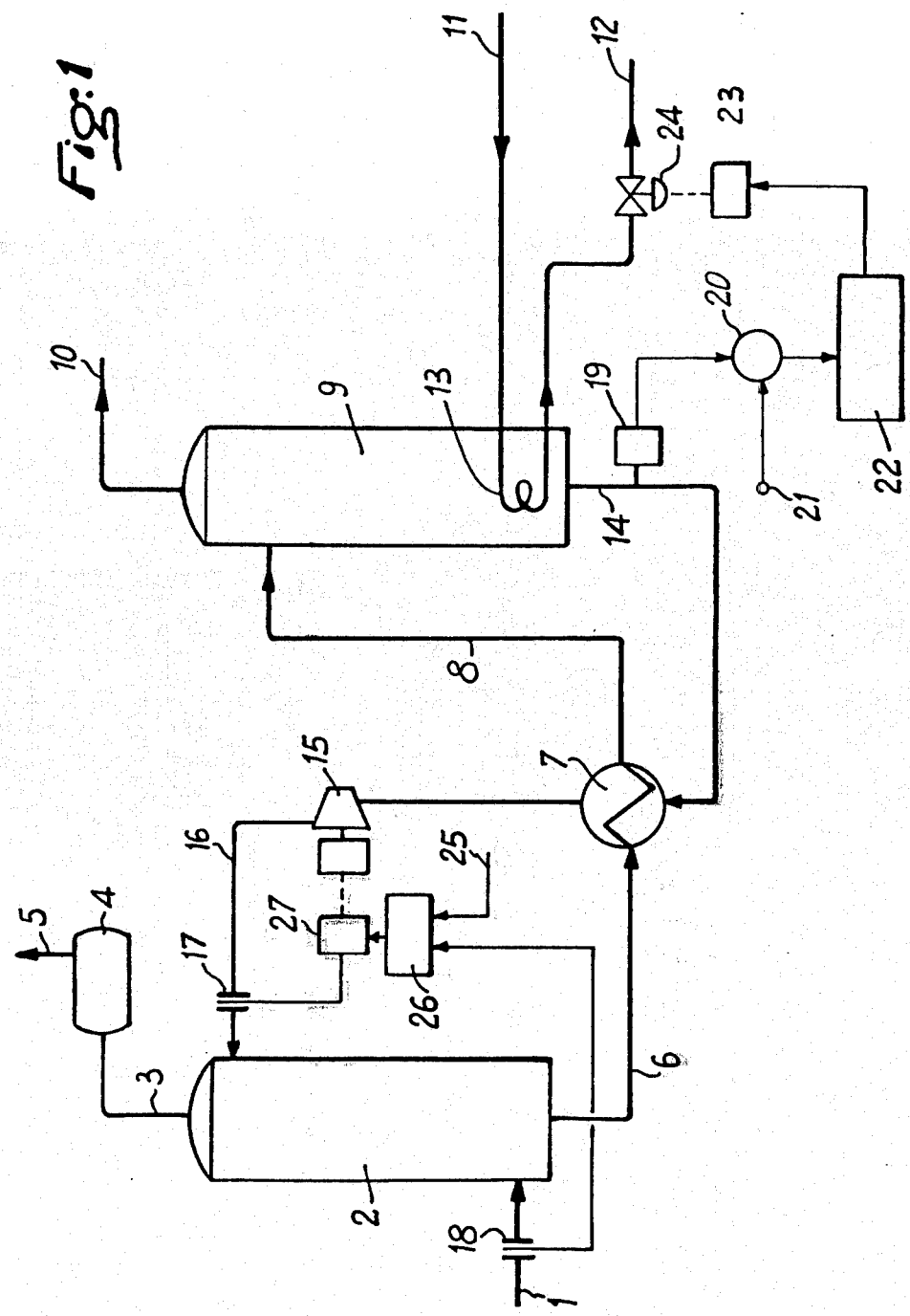
FIG. 1 shows a diagram of a unit to purify gas containing hydrogen sulphide, with a system to implement one embodiment of this improved process.

In FIG. 1, the gas to be purified, containing hydrogen sulphide and possibly other acid compounds, arrives along a pipe 1, on which there is a weight meter 18; it penetrates into the base of an absorber 2, where it comes into contact, in counter-flow, with a hot, concentrated amine solution, entering by another pipe 16, equipped with a steam recycling turbine 15. A weight meter 17 on this pipe 15 measures the flow rate of amine solution entering the absorber. This flow rate is preferably kept in a constant ratio to the flow rate by weight of gas injected into the absorber to be purified. This can be done, for instance, by a regulator 27, which receives a signal produced by a computing unit 26, from a signal representing the flow rate by weight of gas from the first weight meter 18, a signal 25 representing the amine concentration of the regenerated solution, and a signal representing the constant of the ratio between these flow-rates. The regulator controls the speed of rotation of the recycling turbine 15.

The gas leaves the top of the absorber by a pipe 3, and is sent to a caustic washer 4 for final purifying. The pure gas, meeting prescribed standards, is delivered through another pipe 5.

The amine solution used to fix the acid compounds leaves through a pipe 6 at the base of the absorber, passes through an indirect heat exchanger 7, where it is heated to a suitable temperature, and is then sent along a pipe 8 to a regeneration column 9, heated from below by a steam reboiler 13, receiving steam along a pipe 11.

The acid gas released in the regeneration column leaves the top of the column through a pipe 10 and is directed to its place of use, such as a sulphur plant.

The regenerated amine solution leaves the base of the regeneration column along another pipe 14, and transfers some of its calories, in the heat exchanger 7, to the flow of amine solution being sent to the regeneration column before being recycled by means of the steam turbine 15 back to the absorber.

An analyser 19, on a by-pass pipe from the regenerated amine solution pipe 14, measures the sulphur content of the solution and delivers a signal, which is compared in a subtractor 20 with a signal 21 representing optimum sulphur content, possibly from a programming computer (not shown here), which continuously calculates the content that will keep the cost of purification as low as possible. The output signal from the subtractor 20, representing the difference between immediate and optimum sulphur contents, is injected into a compensating unit 22, for example, one with integral and derived proportional action, which produces a signal representing the flow of steam needed to remove this difference. This signal feeds a servomechanism 23, which positions a valve 24 on the reboiling steam outlet pipe 12.

In FIG. 2, the gas to be purified enters an absorber 29 along a pipe 28, on which there is a weight meter 45. The purified gas leaves by another pipe 30 and passes through a caustic washer 31, before being discharged 32. The regenerated amine solution arrives in the absorber along an inlet pipe 43, the flow rate by weight being kept in constant ratio to the flow rate by weight of the gas needing purification, by means of a regulator 60 which controls the speed of rotation of the recycling turbine 42, from a signal transmitted by a computer 59, receiving signals representing the flow of gas entering the absorber, as measured by the weight meter 45, and the amine concentration of the regenerated solution.

The amine solution used to fix the acid compounds is conveyed by a pipe 33 from the absorber, through a heat exchanger 34, to the regeneration column 36, which is heated by a steam reboiler 40 supplied along a pipe 38, on which there is a flow meter 55. An instrument 57 measures the inlet temperature of the amine solution to be regenerated. The acid gas releases during regeneration leaves the column along a pipe 37 on which there is an instrument to measure the pressure inside the column. The regenerated amine solution is conveyed along a pipe 41 from the regeneration column, through the heat exchanger 34, to the turbine 42, which recycles it to the absorber.

A signal 47 representing the sulphur content to be maintained in the amine solution is transmitted to a computer 48, which also receives the various signals from the flow meters 44 and 45, temperature gauge 57 and pressure gauge 56. The signal from the gas flow meter 45 is multiplied in a multiplier 46 by a coefficient representing the overall molar proportion of acid gases in the incoming gas; in addition, before reaching the computer, the flow rate signals pass through systems (not shown here) simulating the dynamic transfers occurring in the absorber, to take account of inertia due to absorption.

From these various values, the computer 48 produces a value representing the theoretical quantity of steam needed to produce optimum sulphur content in the regenerated amine solution, and then works out the difference between this value and the value supplied by the steam flow meter 55, delivering an output signal representing this difference.

An analyser 49, on a by-pass pipe from the regenerated amine solution pipe 41, measures the sulphur content of the solution and delivers a signal, which is compared in a subtractor 50 with a signal 47 representing optimum sulphur content. The output signal from this subtractor feeds a dynamic compensating unit 51, which delivers a signal representing the flow of steam needed to adjust the immediate sulphur content in the regenerated amine solution to the optimum level. The signals from the computer 48, flow meter 55 and compensating unit 51 are added together 52 to produce a signal which is used by a servomechanism 53 to position a valve 54 on the regenerating steam outlet pipe.

What is claimed is:

1. In an apparatus for purifying gas containing at least hydrogen sulfide comprising an absorption zone for contacting a gas containing at least hydrogen sulfide with an amine solution with inlet and outlet means for said gas and amine solution, a regeneration zone containing heating and heat regulating means for regenerating said amine solution containing absorbed hydrogen sulfide by heat, said regeneration zone having inlet and outlet means, conduit means to conduct said gas to said absorption zone, conduit means connecting said absorption zone to said regeneration zone to carry liquid effluent from said absorption zone to said regeneration zone, conduit means for recycling regenerated amine solution to said absorption zone; the improvement which comprises an analyzer to measure the sulphur content of said regenerated amine solution, a subtractor producing a signal proportional to the difference between the sulphur content as measured by the analyzer, and the optimum content, a compensating unit producing from the signal supplied by the subtractor, a signal representing the quantity of steam needed to adjust the immediate sulphur content of the amine solution to the optimum level, and means of altering the flow of regenerating steam in response to the signal representing the quantity of steam needed for adjustment, a computer which produces a signal representing the theoretical quantity of steam needed to obtain optimum sulphur content in the regenerated amine solution, and an addition relay, which receives the signals from the computer and compensating unit, and delivers a resulting signal to control the steam-flow regulation system.

2. An apparatus as defined in claim 1, in which the computer supplies an output signal representing the difference between the theoretical quantity of steam needed to obtain optimum sulphur content in the regenerated amine solution, and a predetermined quantity of steam, and the addition relay receives a signal representing this predetermined quantity, as well as the signals from the computer and compensating unit.

3. An apparatus as defined in claim 1, in which the means of regulating the flow of regenerating steam include a servomechanism which controls the positioning of a valve on the steam outlet pipe.

* * * * *